No. 713,224. Patented Nov. 11, 1902.
A. R. JOHNSON.
COTTON CHOPPER.
(Application filed Mar. 12, 1902.)
(No Model.)
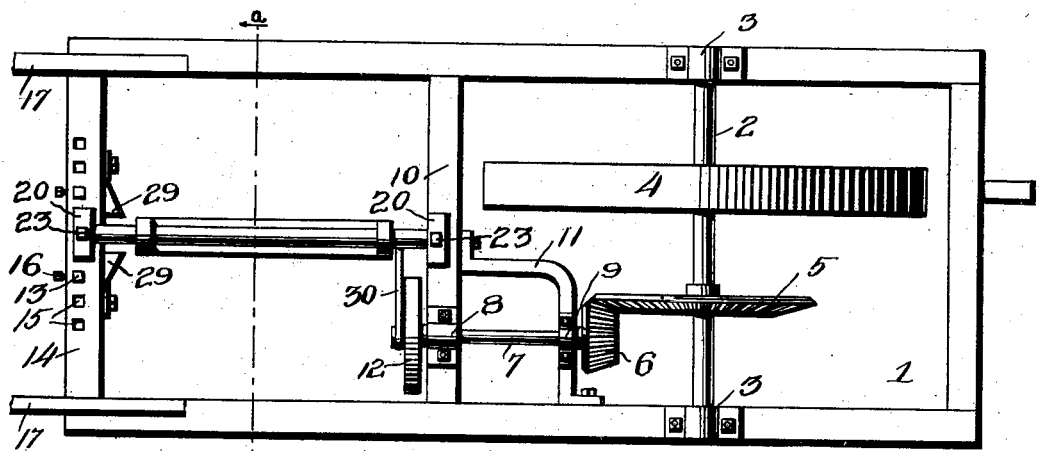
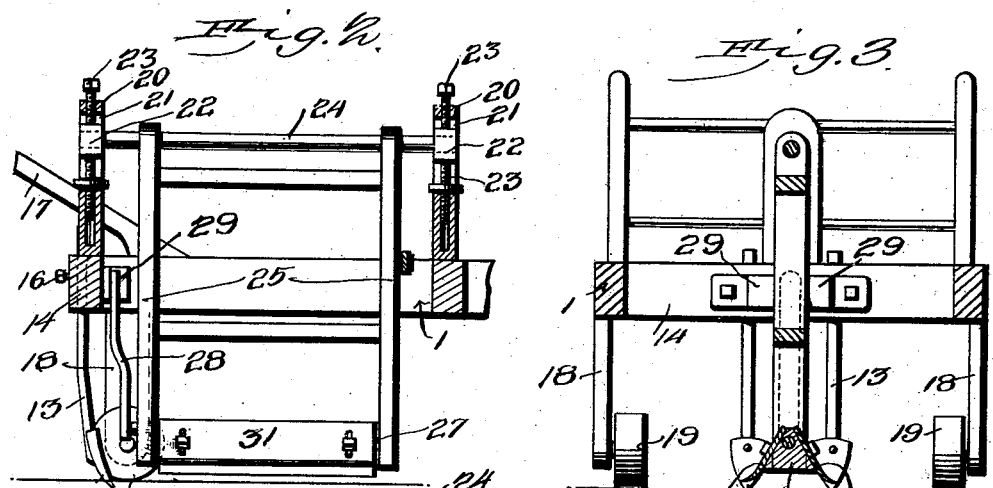
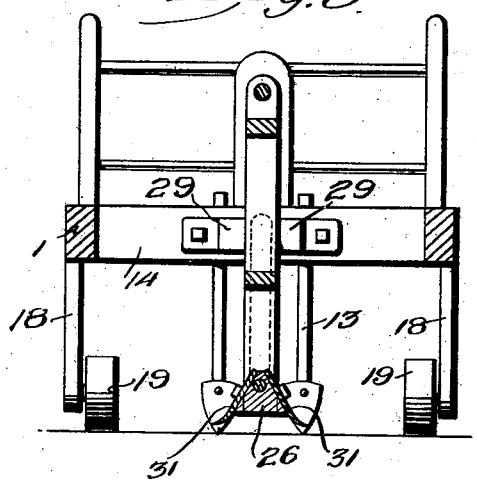
Witnesses
A. R. Johnson, Inventor.
Attorneys

UNITED STATES PATENT OFFICE.

AUGUSTUS R. JOHNSON, OF SPREAD, GEORGIA.

COTTON-CHOPPER.

SPECIFICATION forming part of Letters Patent No. 713,224, dated November 11, 1902.

Application filed March 12, 1902. Serial No. 97,922. (No model.)

*To all whom it may concern:*

Be it known that I, AUGUSTUS R. JOHNSON, a citizen of the United States, residing at Spread, in the county of Jefferson and State of Georgia, have invented a new and useful Cotton-Chopper, of which the following is a specification.

My invention is an improved cotton chopper and cultivator which is also adapted for use in cultivating crops other than cotton; and it consists in the peculiar construction and combination of devices hereinafter fully set forth and claimed.

In the accompanying drawings, Figure 1 is a top plan view of a cotton chopper and cultivator embodying my improvements. Fig. 2 is a vertical longitudinal sectional view of the rear portion of the same. Fig. 3 is a vertical transverse sectional view of the same, taken on a plane indicated by the line *a a* of Fig. 1. Fig. 4 is a detail sectional view looking forwardly, showing the stops, the oscillating frame, the oscillating beam carried thereby and which carries the chopping-blades, and the arm connected to said beam, said arm being disposed in operative relation to the stops.

The frame 1 is here shown as rectangular in form, but may be of any suitable construction. A shaft 2 is disposed transversely with reference to the frame at a suitable distance from the front end thereof and is journaled in bearings 3. On the said shaft is a traction-wheel 4, which is here shown as disposed near the center of the shaft in a position to run near one side of a row of plants when the machine is in operation. Within the scope of my invention I may employ more than one such traction-wheel to impart rotary motion to the shaft 2, and I do not, therefore, desire to limit myself in this particular. A gear-wheel 5, which is here shown as a beveled gear, is secured to and rotated by the shaft. Said gear-wheel 5 engages a pinion 6 at the front end of a longitudinally-disposed shaft 7, which shaft is here shown as journaled in bearings 8 9, which are respectively on a cross-bar 10 of the frame 1, and an angle-bracket 11, which connects said cross-bar to one of the side bars of said frame. On the rear end of the shaft 7 is a crank-wheel 12.

The frame 1 is in practice provided with a pair of cultivating-plows 13, which are here shown as having their standards connected to and vertically and laterally adjustable with relation to the rear cross-bar 14 of the frame 1. Said cross-bar is here shown as having adjusting-openings 15 to receive the upper portions of the plow-standards, whereby the latter may be set at any desired distance apart and to cause the plows to run at any desired depth in the soil on opposite sides of the row, and I also show set-screws 16 to secure the plows when thus adjusted. Within the scope of my invention the plows may be secured to the frame by any suitable means and may be of any suitable construction, and I do not, therefore, desire to limit myself in this particular. Suitable handles 17 are secured to the rear portion of the frame 1. The latter is also provided at or near its rear corners with standards 18, at the lower ends of which are mounted supporting-wheels 19.

The cross-bars 10 14 of the frame 1 are provided with vertical standards 20, which are here shown as having vertical guideways 21, in which are disposed bearing-blocks 22, that are vertically adjustable in the guideways by means of adjusting-screws 23. A shaft 24, which is longitudinally disposed over the center of the rear portion of the main frame 1, is journaled in the said bearings 22, and to this shaft is secured a downwardly-extending oscillating frame 25, which is movable at right angles to the line of draft, and hence across the row. This oscillating frame may be of any suitable construction, and it may be mounted for oscillation by any suitable means, and I do not limit myself in this particular. The bearing-blocks 22 and adjusting-screws 23 are here shown for adjusting the shaft 24, and hence the oscillating frame, vertically to cause the choppers carried by the lower portion of the oscillating frame to operate at any desired depth across the row; but I do not limit myself in this particular, as any suitable means may be employed for thus adjusting the choppers. An axially-movable or partly-revoluble beam 26 is mounted for oscillation, as at 27, in the lower portion of the oscillating frame 25 and has a radially-disposed arm 28, which is here shown as located beyond the rear side of the oscillating frame, the said arm being connected to the oscillating beam, so that the same move in unison. The upper portion of the arm 28 operates between a pair of stops 29, which are here shown as bolted to the inner side of the rear cross-bar 14 of the frame 1. The oscillating frame 25 is connected to the crank-pin of the wheel 12 by a pitman 30, and it will be understood that when the machine is in operation the said frame 25 will be oscillated and caused to move transversely to and fro across a row of cotton or other plants, and it will be further understood that the beam 26, which carries the chopping blades or hoes 31, will be turned axially at each stroke of the oscillating frame by the arm 28 and one of the stops 29, and hence the chopping blades or hoes, which are disposed reversely on opposite sides of the beam 26, will be appropriately adjusted at the end of each stroke of the oscillating frame and set at the required angle to make the next stroke on the reverse movement of the oscillating frame effective.

A cotton chopper and cultivator thus constructed is exceedingly strong and durable, is efficient in operation, and may be manufactured and sold at a low price.

Having thus described my invention, I claim—

1. In a chopper of the class described, in combination with an oscillating element, pivotally-mounted choppers carried thereby, said choppers having a radially-disposed arm, and fixed stops between which said arm plays, whereby the choppers are adjusted at each stroke of the oscillating element, substantially as described.

2. In a chopper of the class described, the combination of an oscillating element, pivotally-mounted oppositely-disposed choppers carried thereby, and means to partly turn said choppers at each stroke of the oscillating element, and thereby adjust said choppers for the reverse stroke, substantially as described.

In testimony that I claim the foregoing as my own I have hereto affixed my signature in the presence of two witnesses.

AUGUSTUS R. JOHNSON.

Witnesses:
 JAMES STAPLETON,
 D. E. NEAL.